(12) United States Patent
Gschwantner et al.

(10) Patent No.: US 12,319,171 B2
(45) Date of Patent: Jun. 3, 2025

(54) WAKE-UP PROCESS FOR ELECTRICAL NETWORKS IN A VEHICLE HAVING AN ELECTRICAL DRIVE TRAIN

(71) Applicant: Robert Bosch GmbH, Stuttgart (DE)

(72) Inventors: Guenter Gschwantner, Wagram/Wagram (AT); Martin Trunk, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 17/782,687

(22) PCT Filed: Nov. 17, 2020

(86) PCT No.: PCT/EP2020/082330
§ 371 (c)(1),
(2) Date: Jun. 6, 2022

(87) PCT Pub. No.: WO2021/110403
PCT Pub. Date: Jun. 10, 2021

(65) Prior Publication Data
US 2023/0010616 A1 Jan. 12, 2023

(30) Foreign Application Priority Data
Dec. 6, 2019 (DE) ...................... 10 2019 219 032.4

(51) Int. Cl.
*B60L 58/20* (2019.01)
*H02M 1/00* (2007.01)

(52) U.S. Cl.
CPC .......... *B60L 58/20* (2019.02); *H02M 1/0032* (2021.05); *B60Y 2200/91* (2013.01)

(58) Field of Classification Search
CPC .. B60L 2210/10; B60L 58/20; B60Y 2200/91; H02M 1/0032; Y02T 10/70
See application file for complete search history.

(56) References Cited

U.S. PATENT DOCUMENTS 8,749,198 B2 6/2014 Klesyk
11,552,578 B1 * 1/2023 Sahoo ................. H02M 1/4233
(Continued)

FOREIGN PATENT DOCUMENTS

CN 102555951 A 7/2012
DE 102011010475 B3 2/2012
(Continued)

OTHER PUBLICATIONS

Translation of International Search Report for Application No. PCT/EP2020/082330 dated Feb. 10, 2021 (2 pages).

*Primary Examiner* — Babar Sarwar
(74) *Attorney, Agent, or Firm* — Michael Best & Friedrich LLP

(57) ABSTRACT

The invention relates to a device for activating a control unit in a second electrical network, starting from a first electrical network in a vehicle having an electrified drive train, the first electrical network being galvanically isolated from the second electrical network, the device comprising: a signal generating module for generating a wake-up signal in the first electrical network; a transformer which is designed to transmit the wake-up signal and electrical power from a first transformer winding on the first electrical network to a second transformer winding on the second electrical network, a rectifier circuit in the second electrical network, which circuit is connected to the second transformer winding and is designed to rectify the transmitted wake-up signal, and a switching element in the second electrical network, which element is connected to the rectifier circuit and is designed to activate a control unit (60) when the rectified wake-up signal is present or absent at an input of the switching element (50).

13 Claims, 2 Drawing Sheets

(56) References Cited

U.S. PATENT DOCUMENTS

| | | | | |
|---|---|---|---|---|
| 2004/0155636 | A1* | 8/2004 | Fukui | G05F 1/56 |
| | | | | 323/281 |
| 2009/0212634 | A1* | 8/2009 | Kojima | B60L 58/20 |
| | | | | 307/77 |
| 2010/0329363 | A1 | 12/2010 | Ng | |
| 2011/0041595 | A1* | 2/2011 | Dank | G01M 15/02 |
| | | | | 73/116.06 |
| 2013/0244063 | A1* | 9/2013 | Dhar | B60L 50/64 |
| | | | | 429/149 |
| 2014/0070736 | A1* | 3/2014 | Gorka | B60L 50/40 |
| | | | | 318/139 |
| 2015/0015199 | A1* | 1/2015 | Krammer | B60L 53/12 |
| | | | | 320/108 |
| 2015/0042161 | A1* | 2/2015 | Proebstle | B60R 16/03 |
| | | | | 307/10.6 |
| 2015/0054563 | A1 | 2/2015 | Flynn et al. | |
| 2015/0061567 | A1* | 3/2015 | Gorka | H02P 25/22 |
| | | | | 323/282 |
| 2015/0098255 | A1* | 4/2015 | Nate | H02M 3/33523 |
| | | | | 363/21.16 |
| 2015/0210165 | A1* | 7/2015 | Lachmund | B60L 3/0092 |
| | | | | 307/10.1 |
| 2015/0280584 | A1* | 10/2015 | Gong | H02M 3/33592 |
| | | | | 363/21.13 |
| 2016/0020700 | A1 | 1/2016 | Zhang et al. | |
| 2016/0207412 | A1* | 7/2016 | Krammer | B60L 53/305 |
| 2016/0329816 | A1* | 11/2016 | Zhang | H02M 3/33507 |
| 2019/0089257 | A1* | 3/2019 | Chung | H02M 1/08 |

FOREIGN PATENT DOCUMENTS

| | | |
|---|---|---|
| DE | 102013221580 A1 | 4/2015 |
| DE | 102015200124 A1 | 7/2016 |
| DE | 102017216939 A1 | 3/2019 |
| EP | 2983283 A1 | 2/2016 |
| EP | 3562048 A1 | 10/2019 |
| WO | 2018153679 A1 | 8/2018 |
| WO | 2019160330 A1 | 8/2019 |

* cited by examiner

WAKE-UP PROCESS FOR ELECTRICAL NETWORKS IN A VEHICLE HAVING AN ELECTRICAL DRIVE TRAIN

BACKGROUND OF THE INVENTION

The present invention relates to an assembly for activating a control unit in a second electrical network which is galvanically isolated from a first electrical network, a corresponding method and a computing unit for the execution thereof.

Hybrid and electric vehicles generally employ a minimum of two networks: a high-voltage or traction network, which is connected to a corresponding high-voltage battery, and an on-board low-voltage network, which is likewise connected to a corresponding low-voltage battery. The voltage on the high-voltage network can be, for example, 48 V, 60 V or higher, whereas the low-voltage network is generally provided with a 12 V supply. Preferably, the two networks are galvanically isolated from one another, and are thus mutually potential-free, particularly at higher voltages.

In the switched-off state of a vehicle, it is intended that the standby current consumption should be as low as possible, in order to prevent any discharging of the low-voltage battery. Thus, for example, the standby current consumption of a control device should not exceed e.g. 100 μA.

The high-voltage network can optionally be switched-off. If the voltage on the high-voltage network is switched-in, or immediately a minimum voltage on the high-voltage network is exceeded, this information is employed for the wake-up of control devices which are connected both to the high-voltage network and to the low-voltage network, in order to ensure, for example, the maintenance of protection and safety functions. The potential-free transmission of this signal is customarily executed by means of inductive or capacitive signal transmitters which, however, customarily require a voltage supply on both the primary and the secondary side. Accordingly, the voltage supply for a signal transmitter of this type, even in the event of a switched-off control device, cannot be switched-off, such that an increased standby current consumption, generally in excess of 100 μA, is inevitable. Likewise, in case of the employment of an optical signal transmitter, at least one pull-up resistor is required between the phototransistor and the battery such that, here again, standby current consumption is increased in an unwanted manner.

SUMMARY OF THE INVENTION

According to the invention, a device and a method are proposed for activating a control unit in a second electrical network, originating from a first electrical network which is galvanically isolated therefrom, and a computing unit for the execution thereof, having the characteristics of the independent patent claims. Advantageous configurations are the subject matter of the sub-claims, and of the following description.

The function of the invention is the transmission of a wake-up signal and electrical energy, by means of a transformer, from a first electrical network to a second electrical network, in which both are then employed for the actuation of a switching element, in order to activate a control unit.

By means of a wake-up circuit of this type, the second network (e.g. the low-voltage on-board network) can be activated upon the switch-on of the first network, with no unwanted increased in standby current consumption on the second network side. The requisite energy for wake-up or activation is transmitted by means of the transformer. In particular, the secondary side of the transformer and the rectifier incorporate no external energy supply. In particular, the secondary-side switching element comprises a semiconductor switch, and the rectified wake-up signal is present on a switching terminal (e.g. a gate) of the semiconductor switch. Energy for actuating the semiconductor switch, e.g. for the charging or recharging of the gate, thus originates from the primary side.

It should be emphasized that, depending upon the specific configuration of the circuit, activation of the control unit can be initiated both by the transmission or inception of the wake-up signal, and by the switch-off or absence of the wake-up signal.

According to one form of embodiment, the rectifier circuit can incorporate a voltage multiplier circuit, such that the rectified signal achieves a sufficiently high voltage level for the switching element.

Preferably, transformer windings at the potential barrier can be configured in the form of air-core coils. Alternatively, however, the transformer windings can also be provided with a flux concentrator, or can accommodate the latter.

The transformer can thus be configured, for example, in the form of a planar transformer. In particular, it is possible for the first transformer winding and the second transformer winding to be executed in the form of printed conductors or in at least one circuit board, i.e. as windings which are incorporated into the circuit board, or to be constituted directly as parallel-oriented printed conductors, e.g. arranged in an elongated spiral pattern on the circuit board. A configuration of this type requires only simple components, and can be produced in an exceptionally space-saving and cost-effective manner, particularly if the windings are distributed, for example, over a number or all of the inner layers of the circuit board.

As a wake-up signal, the signal generation module can generate a clock pulse signal at a specific frequency, or an individual signal pulse. An existing microcontroller, for example, can be employed in a simple manner for this purpose.

According to one exemplary embodiment, the first electrical network is a high-voltage network of the vehicle, and the second electrical network is a low-voltage network of the vehicle. Accordingly, on the low-voltage network side, no voltage supply is required, such that the standby current consumption on the positive battery terminal (terminal 30) of the on-board network battery is not increased.

According to one form of embodiment, the wake-up signal can be generated on the basis of a resonant frequency of the oscillating circuit which is constituted by the first transformer winding and the parallel-connected capacitance of the circuit. In this manner, the efficiency of energy transmission system can be significantly improved.

The wake-up signal can thus comprise a signal having a specific frequency, or an individual signal pulse.

A computing system according to the invention, e.g. a control device of a motor vehicle, particularly with respect to programmatic implementation, is configured to execute a method according to the invention. A computing system of this type is connected to both electrical networks, and comprises an activation device according to the invention.

BRIEF DESCRIPTION OF THE DRAWINGS

Further advantages and configurations of the invention proceed from the description and the attached drawing.

The invention is schematically represented in the drawing on the basis of an exemplary embodiment, and is described hereinafter with reference to the drawing.

DETAILED DESCRIPTION

Figure 1:
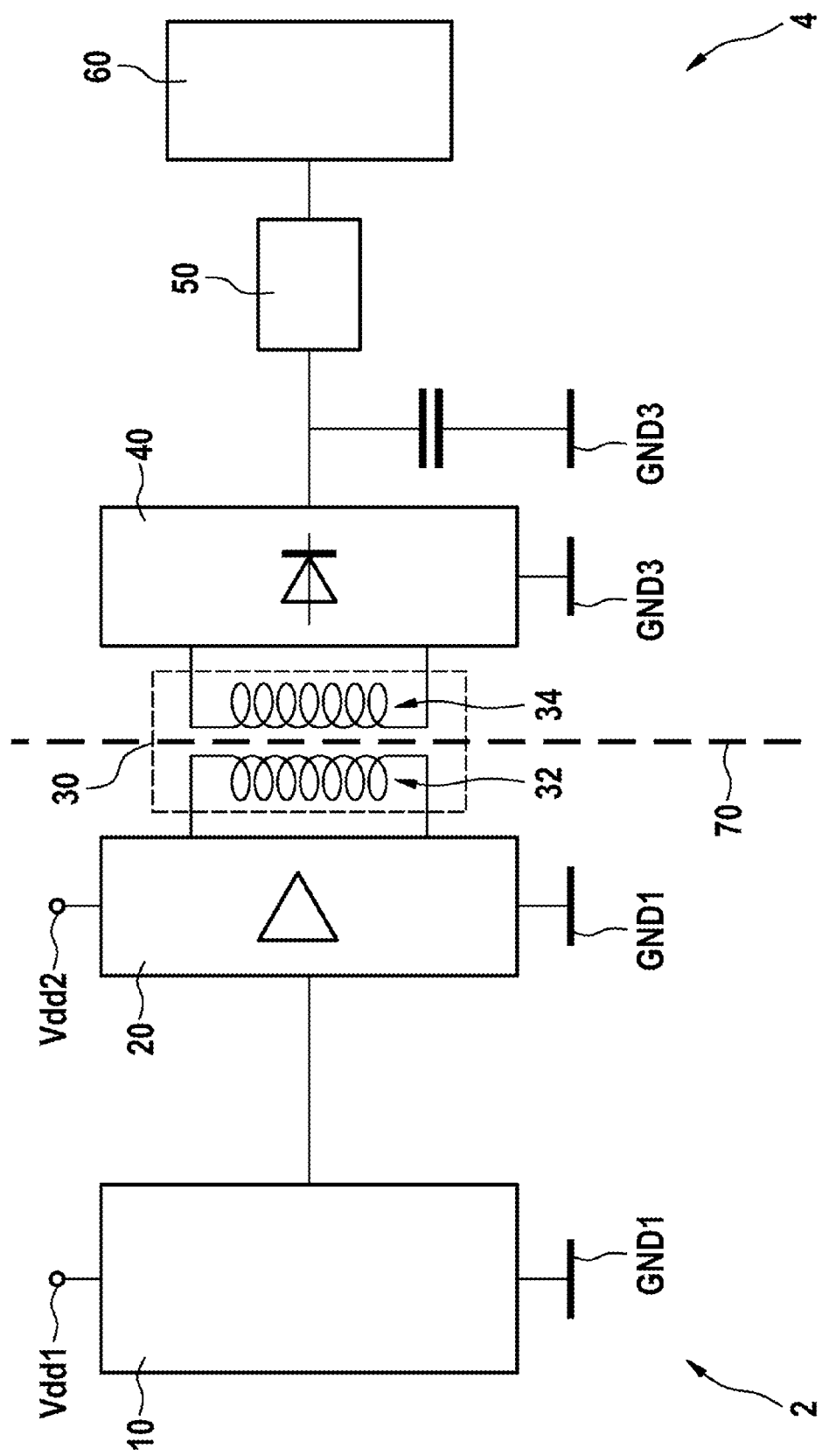
FIG. 1 shows an exemplary circuit diagram of a wake-up circuit according to the present invention.

The schematically-represented circuit according to FIG. 1 shows components of an activation device (wake-up circuit), which is employable in a vehicle have two separate on-board electrical networks 2, 4. Forms of embodiment of the invention can be employed in arbitrary vehicles having an electrified drive train, for example in plug-in hybrid vehicles (PHEV), full hybrid vehicles, fully electric vehicles, etc. The two on-board networks are customarily described as a high-voltage network 2 and a low-voltage network 4, each having a dedicated energy supply in the form, for example, of a respectively connected battery (not represented). For example, the low-voltage network 4 can be a 12 V on-board voltage network, whereas the high-voltage network 2 can assume a battery voltage in excess of 60 V, wherein the network voltages indicated are exemplary only, and are not essential to the invention.

In order to prevent any increase in standby current consumption, according to the invention, a wake-up signal is transmitted from the high-voltage network 2 to the low-voltage network 4 via a transformer 30, which is capable of transmitting both the wake-up signal and the requisite power or energy for the supply of a switching element for the activation of the high-voltage network 2 between its two windings 32, 34, from one network to the other, with no necessity for a dedicated power supply on the side of the low-voltage network 4.

FIG. 1 shows the high-voltage network 2 on the left-hand side, whereas the low-voltage network 4 of the vehicle is represented on the right-hand side. The two networks are galvanically isolated from one another; the broken line between the two coupled windings indicates the galvanic isolation 70. In combination, the primary-side winding 32 on the high-voltage side 2 and the secondary-side winding 34 on the low-voltage side 4 constitute the transformer 30.

On the high-voltage side 2, a signal generation module 10 is located which can be, for example, a corresponding microcontroller or circuit module, which is connected to a supply voltage $V_{dd1}$ and a ground potential. The signal generation module 10 can be, for example, a frequency generator in the form of a microcontroller, which is already present for other purposes. Optionally, in place of a clock pulse generated at a specific frequency, a single pulse can also be delivered, which serves as the wake-up signal.

The wake-up signal generated is fed to an optional coil driver module 20, which is likewise connected to a supply voltage $V_{dd2}$ and the ground potential, wherein the supply voltages of the coil driver $V_{dd2}$ and the clock pulse generation module $V_{dd1}$ can be equal or different.

The primary-side winding 32 of the transformer 30, i.e. the winding on the high-voltage network side, in combination with the parallel-connected capacitance of the circuit, can additionally constitute an oscillating circuit. Consideration of the resonant frequency of this system in the generation of the wake-up signal can deliver a significant improvement in the efficiency of this circuit.

The wake-up signal can then be delivered on the primary-side winding 32 of the transformer, which transmits the signal to the secondary-side winding 34. On the low-voltage network side, a rectifier module 40 can be connected to this secondary-side winding 34 which operates, for example, by the principle of a voltage doubler rectification circuit, or another voltage multiplier circuit, i.e. a circuit which generates a DC voltage from the AC voltage applied which is greater than the peak value of the input voltage. This rectifier 40 can thus generate, from the wake-up signal which is transmitted via the transformer 30, a sufficiently high voltage level, which can then be employed in turn as a direct input signal for a switching element 50 which is capable, according to the input, e.g. of the switch-in of the voltage supply which is tapped on the low-voltage network 4, e.g. via the control device 60. As a switching element 50, for example, an integrated circuit or a prefabricated chip, such as a system-basis-chip (SBC), which can deliver the requisite voltage supplies for the control device which is to be switched-in, can be employed. It is relevant, however, that the rectified output signal alone is employed as a switching signal for the switching element 50, e.g. for the charging or recharging of a gate capacitance for the switching of a semiconductor switch such as, for example, a MOSFET or an IGBT. The load capability of the circuit section comprised of the rectifier 40 and the transformer 30 is thus sufficient to permit the switching of the switching element 50 by the rectified output signal alone, with no external energy supply.

According to one exemplary embodiment, the transformer 30 for the transmission of the wake-up signal is configured with air-core coils, i.e. coreless windings. In a particularly advantageous variant, the transformer 30 can be configured as a planar transformer, the windings of which are constituted on a circuit board or PCB. In a simple form, the windings 32, 34 can be directly present in the form of printed conductors on both surfaces of a circuit board, such that the main body of the circuit board constitutes the potential barrier 70.

The circuit board surface area required for a transformer 30 of this type can be further optimized, wherein the requisite windings 32, 34 of the transformer are distributed over a number or all the available inner layers, such that region of the potential barrier which is not employable on the grounds of creepage distances and clearances can be fully exploited. In this manner, a wake-up circuit can be produced in a compact and cost-effective manner.

Although, in the present example, a transformer with no magnetic core has been preferred, this can optionally be replaced by a component-fitted transformer.

Figure 2:
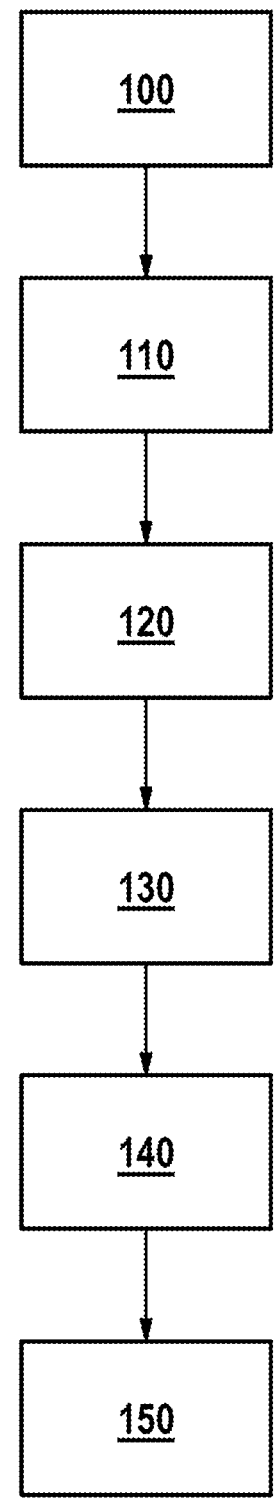
FIG. 2 shows exemplary process steps, according to one form of embodiment of the invention.

FIG. 2 shows a schematic representation of exemplary method sequence according to the invention.

In step 100, a stipulated condition is fulfilled wherein, for example, a high voltage in excess of 60 V is present in the first network, which dictates the initiation of the wake-up method.

In step 110, a wake-up signal having a specific frequency is generated by a signal generation module, such as a frequency generator, and is transmitted from the first transformer winding on the high-voltage side to the second winding, in step 120.

Step 130 represents the generation of a voltage level in the rectifier module from the wake-up signal transmitted, wherein the voltage level thus constituted is then transmitted to an input of a switching element, in accordance with step 140.

In step 150, as a consequence of the input level applied to the switching element, the requisite supply voltage for a control device is delivered by the switching element, such that a successful wake-up or activation of the control device can be executed.

It is also possible for the switching element or system-basis-chip to be configured on the low-voltage side such that, in response to various signals (e.g. a high-voltage wake-up signal, CAN-WakeUp, a positive signal from the ignition starter switch on terminal 15, etc.), different supply voltages can be switched on and off.

In an alternative embodiment, the wake-up signal can be implemented such that, via the transformer windings, a wake-up signal is continuously transmitted from the high-voltage side to the low-voltage side, in response to which a high level is ultimately present on the switching element, and a wake-up process is initiated accordingly, wherein a low level is detected by an at least temporary switch-off of the wake-up signal.

The invention claimed is:

1. A device for activating an electronic controller in a second electrical network originating from a first electrical network in a vehicle having an electrified drive train, wherein the first electrical network is galvanically isolated from the second electrical network, the device comprising:
    a signal generator configured to generate a wake-up signal in the first electrical network;
    a transformer, which is configured to transmit the wake-up signal and electrical energy from a first transformer winding on the side of the first electrical network to a second transformer winding on the side of the second electrical network;
    a rectifier circuit in the second electrical network, which is connected to the second transformer winding and is configured for the rectification of the wake-up signal and the electrical energy thus transmitted, and
    an electronic switching element in the second electrical network, which is connected to the rectifier circuit and is configured, according to the presence or absence of the rectified wake-up signal on an input of the electronic switching element, to activate an electronic control device.

2. The device as claimed in claim 1, wherein the rectifier circuit comprises a voltage multiplier circuit.

3. The device as claimed in claim 1, wherein the first and the second transformer windings are configured in the form of air-core coils.

4. The device as claimed in claim 1, wherein the transformer is constituted in the form of a planar transformer.

5. The device as claimed in claim 4, wherein the first transformer winding and the second transformer winding are configured in the form of printed conductors on or in at least one circuit board.

6. The device as claimed in claim 1, wherein the signal generator generates a clock pulse signal at a specific frequency.

7. The device as claimed in claim 1, wherein the first electrical network is a high-voltage network of the vehicle, and the second electrical network is a low-voltage network of the vehicle.

8. The device as claimed in claim 1, wherein the electronic switching element (50) comprises a semiconductor switch, and the rectified wake-up signal is applied to a switching terminal of the semiconductor switch.

9. A method for activating an electronic controller in a second electrical network by means of a first electrical network in a vehicle having an electrified drive train, wherein the two networks are galvanically isolated from one another, the method comprising:
    generating a wake-up signal in a signal generator in the first electrical network;
    transmitting the wake-up signal and electrical energy, by means of a transformer, from a first transformer winding in the first electrical network to a second transformer winding in the second electrical network;
    rectifying the transmitted signal by a rectifier module in the second electrical network; and
    routing the rectified wake-up signal to an input of an electronic switching element in the second electrical network; and
    activating via the electronic switching element, in response to the presence or absence of the rectified wake-up signal, a connected electronic control device.

10. The method as claimed in claim 9, comprising generating the wake-up signal on the basis of a resonant frequency of the oscillating circuit constituted by the first transformer winding and parallel-connected capacitance of the circuit.

11. The method as claimed in claim 9, wherein the wake-up signal comprises a clock pulse signal having a specific frequency.

12. The method as claimed in claim 9, wherein the wake-up signal comprises a signal having a single signal pulse.

13. A computing unit for activating an electronic controller in a second electrical network by means of a first electrical network in a vehicle having an electrified drive train, wherein the two networks are galvanically isolated from one another, by:
    generating a wake-up signal in a signal generator in the first electrical network;
    transmitting the wake-up signal and electrical energy, by means of a transformer, from a first transformer winding in the first electrical network to a second transformer winding in the second electrical network;
    rectifying the transmitted signal by a rectifier module in the second electrical network;
    routing the rectified wake-up signal to an input of an electronic switching element in the second electrical network; and
activating via the switching element, in response to the presence or absence of the rectified wake-up signal, a connected electronic control device.

* * * * *